United States Patent [19]

Shoji

[11] Patent Number: 4,755,948
[45] Date of Patent: Jul. 5, 1988

[54] BAR MATERIALS GATHERING CONTROL SYSTEM

[75] Inventor: Morio Shoji, Kanagawa, Japan

[73] Assignee: Mitsubishi Denki Kabushiki Kaisha, Tokyo, Japan

[21] Appl. No.: 875,408

[22] Filed: Jun. 17, 1986

[30] Foreign Application Priority Data

Jul. 16, 1985 [JP] Japan .................. 60-156301

[51] Int. Cl.⁴ ............................. G06F 15/00

[52] U.S. Cl. ........................... 364/472; 83/84; 83/365; 83/370

[58] Field of Search ............ 364/472, 474, 475; 83/84, 85, 360, 364, 365, 370

*Primary Examiner*—Jerry Smith
*Assistant Examiner*—Allen MacDonald
*Attorney, Agent, or Firm*—Wolf, Greenfield & Sacks

[57] ABSTRACT

A bar material gathering control system wherein the frequency of use of cutting bites can be automatically made uniform over the cutting face whereby the cutting blade can be used efficiently.

3 Claims, 9 Drawing Sheets

Standard Pattern Memory

| Size And Shape |   |
|---|---|
| Upper Limit | |
| Lower Limit | |
| Gathering Pattern For Single Bar | 1 |
| | 2 |
| | 3 |
| Gathering Pattern For Two Bars | 1 |
| | 2 |
| | 3 |
| | |
| Gathering Pattern For Sixteen Bars | 1 |
| | 2 |
| | 3 |

Counter Memory

| Count For No.1 Groove |
|---|
| No. 2 |
| |
| No. 16 |

Groove Pattern Not To Be Used

| Usable/Not Usable For No.1 |
|---|
| No. 2 |
| |
| No. 16 |

Gathering Pattern Cycle No.

| For Single Bar |
|---|
| For Two Bars |
| |
| For Sixteen Bars |

BAR MATERIALS GATHERING CONTROL SYSTEM

BACKGROUND OF THE INVENTION

1. Field of the Invention

This invention relates to a control system for gathering bar materials such as steel bars in a steel bar production line in an iron and steel plant.

2. Description of the Prior Art

Figure 1:
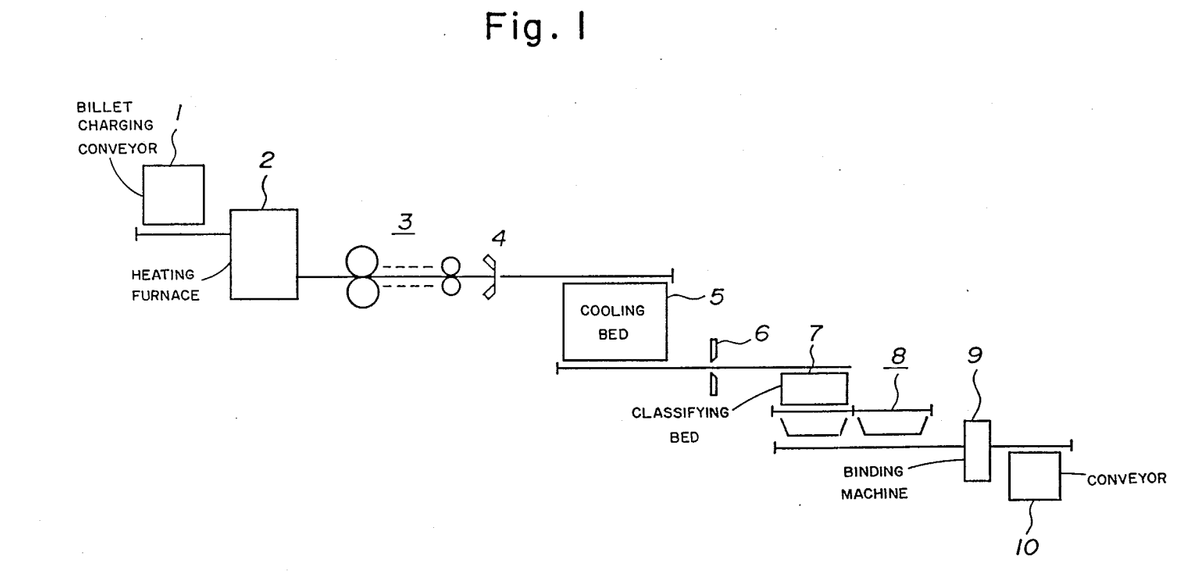
FIG. 1 shows the entire arrangement of a bar materials gathering control system in the prior art.

In the production of steel bars, steel bars are normally produced in the steps shown in FIG. 1. Namely, the raw materials are in the form of rectangular prisms or so-called billets having a sectional size of 155 mm×155 mm and a length of 12 m. These billets are transferred to a billet charging conveyor 1 by means of a crane apparatus. Then, the billets are successively charged into a heating furnace 2 piece by piece and heated up to a specified temperature at which the billets are discharged out of the heating furnace. In this heating furnace, the billets are transferred from the charging end to the discharging end while being heated therein.

When the billets are heated up to a specified temperature, they are discharged out of the heating furnace to a rolling mill 3 where they are rolled to a specified size. When the billets are rolled, they are cut by a hot shear 4 to a suitable length for them to be accommodated in a cooling bed 5. The bar materials which are placed on the cooling bed are referred to as divided bars and are cooled by air on the cooling bed. A group of several divided bars are then together cut to a specified length by a cold shear 6. The sheared materials are then transferred to a classifying pocket 8 by a classifying bed 7 and are gathered in classifying pocket 8 as a group comprising a specified number of bars. Each group is transferred as a unit to a binding machine 9 where they are bound and then transported to a product storage yard by means of a crane or the like by way of a conveyor 10.

Figure 2:
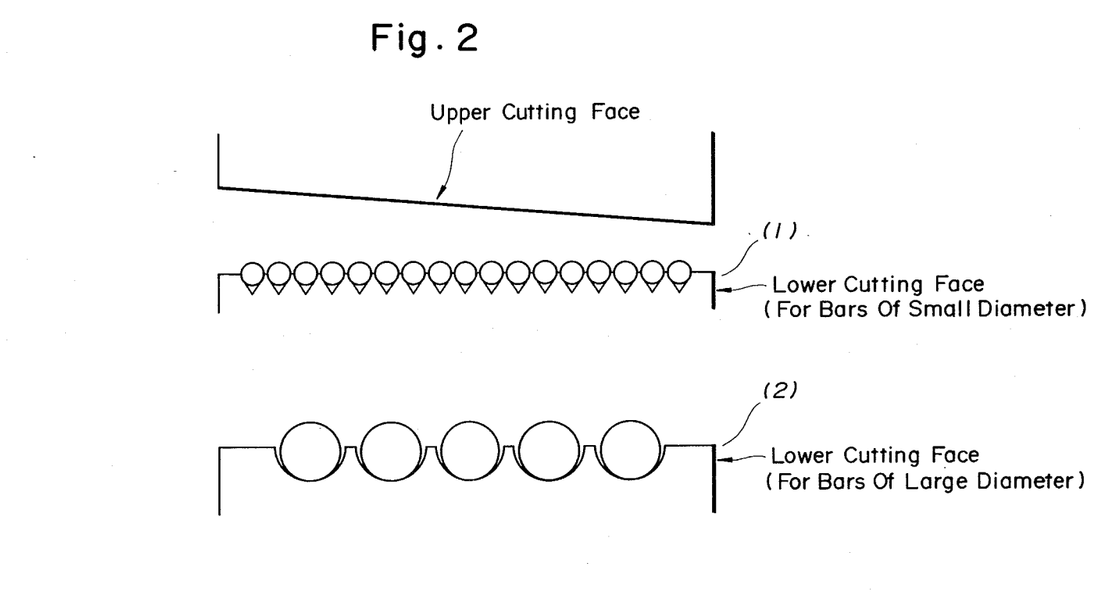
FIG. 2 shows groove patterns of the cutting face of a shear.

At the time of cold shearing said divided bars, it has been normal practice for an operator to determine how many divided bars are required to be cut in accordance with the actual number of divided bars available and the required number of bars ordered. As shown in FIG. 2, the cold shear has cutting blades of different sections depending on the size of the divided bars to be cut. Additionally, the maximum number of bars to be cut at one time is limited by the capacity of the cold shear. FIG. 2 shows the groove patterns at the cutting face of the cold shear. The pattern 1 in FIG. 2 is for bars of the minimum size, and divided bars corresponding to 17 grooves may be cut by this. On the other hand, although the pattern 2 which is for bars of the maximum size has 5 grooves, the maximum number of bars which can be cut with it is limited to three.

PROBLEM IN THE PRIOR ART

In the steel bar control unit according to the prior art, the operator had to determine the number of bars to be cut in consideration of the above-mentioned limitations, and hence he could not determine the number of bars to be cut in such a manner that every groove in each cutting blade could be equally utilized within the same size. Hence, depending on the particular grooves of the cutting face, the rate of utilization varied considerably and, as a result, it has not been possible for the cutting blade to be efficiently used.

Further, with respect to judgement as to the optimum time for exchange of the blades, this has been solely exercised on the basis of the visual observation of an operator in respect of the cutting face and the blade. It has therefore been impossible to determine the time for exchange of the blade in accordance with the rate of actual cutting.

SUMMARY OF THE INVENTION

The present invention has been proposed in order to eliminate the drawbacks inherent to the prior art. According to the present invention, a unit is provided which enables the rate of use for every groove of the cutting blade to be determined such as to be uniform with respect to each other and which also indicates the time when the cutting blades should be changed.

The control system for gathering steel bars according to the present invention is characterized by incorporating a gathering operation computing means adapted to control the gathering of the steel bars to be cut in such a manner that the groove patterns at the cutting face to be utilized may be automatically determined in accordance with the arrangement of steel bars to be cut, the required length to be cut and other requirement data so that the rate of use of the cutting blades may be uniform over the same cutting face without being localized or out of balance. Further, another aspect of the present invention is the incorporation of a counting means adapted to count the rate shearing bars for every groove.

The gathering operation computing means functions to automatically determine the groove pattern at the cutting face to be employed and to control the gathering of bar materials to be cut so that the frequency of use of the cutting blades employed for cutting may be uniform over the entire cutting face of these blades and is not localized. The other aspect of the invention is adapted to indicate the moment when the number of bars reaches a specified value.

BRIEF DESCRIPTION OF THE DRAWINGS

The foregoing features and other aspects of the invention are explained in the following detailed description which is to be read with reference to the accompanying drawings wherein.

DETAILED DESCRIPTION OF THE PREFERRED EMBODIMENTS

Before referring to the Figures in detail, it should be noted that the same numerals or corresponding reference numerals are employed with respect to parts having the same constitution as those in the prior arts and explanation thereof is therefore omitted herein.

Figure 3:
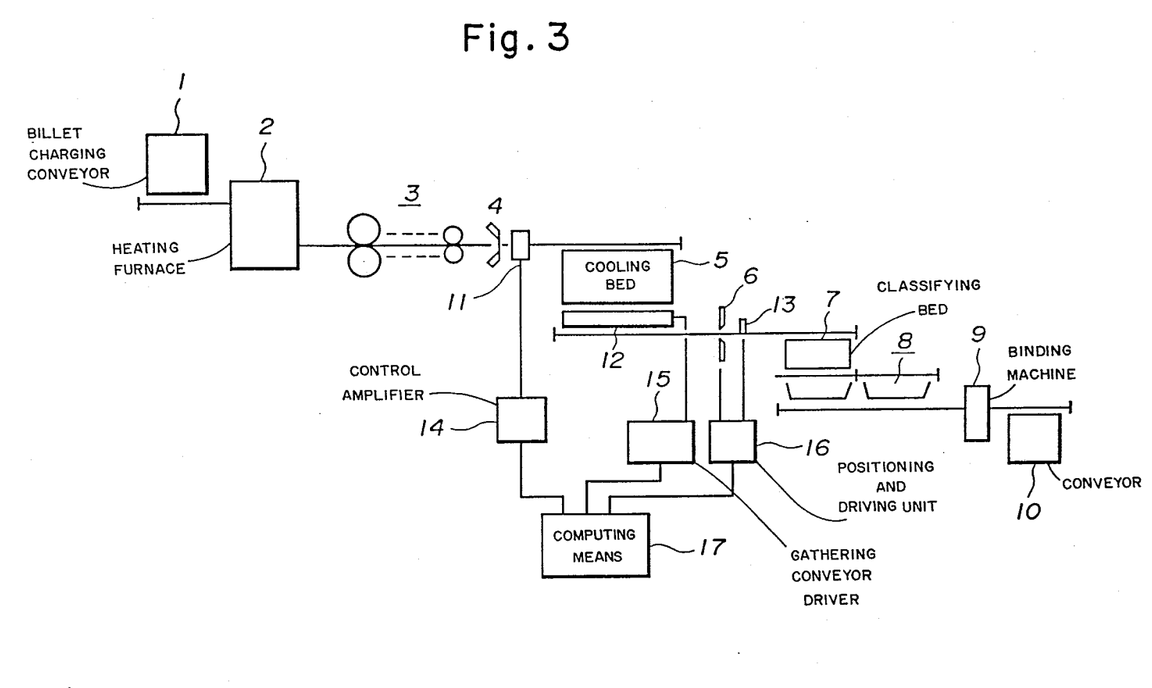
FIG. 3 shows the entire constitution of the control system for gathering bar materials according to the invention.
Figure 4:
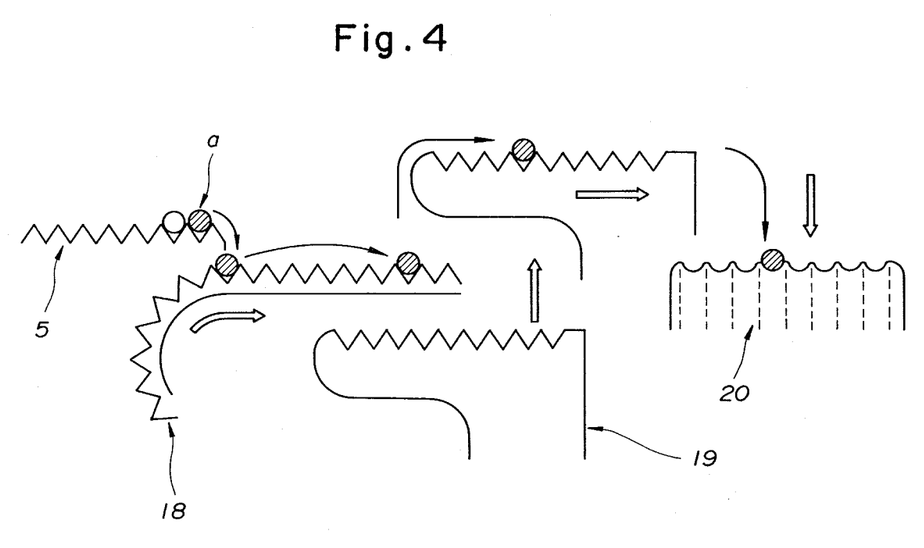
FIG. 4 is an explanatory view illustrating a way of gathering bars.

FIG. 3 shows the overall constitution of an embodiment of the present invention wherein numeral 11 denotes a device for measuring the length of a steel bar to be placed on the cooling bed 5, numeral 12 a gathering device adapted to separate and gather again the steel bars which have been once gathered on the cooling bed into a requisite group of several steel bars, numeral 13 a stopper device adapted to stop the gathered steel bars to be cut at the specified position, thus allowing the steel bars to be cut to the required length, numeral 14 a control amplifier for the length measurement apparatus, numeral 16 a positioning and driving unit adapted to enable the gathered steel bars to be transferred when the same have been cut with the stopper held in a lowered condition and to drive the shear and position the bar materials so that they may be cut by the cutting face at the position where the desired length has been attained, and numeral 17 a gathering operation computing means adapted to calculate and determine the number of steel bars to be next gathered and the groove pattern for gathering the steel bars in accordance with the arrangement of the bars on the cooling bed, the required length and the order requirement data for the steel bars prepared in advance and in consideration of the rate of actual use of the respective grooves of the cutting face now to be used. It is to be noted here that the length measurement apparatus 11, the control amplifier 14, the positioning and driving unit 16 and the gathering operation computing means 17 constitute as a whole a control means 21. FIG. 4 is an explanatory view explaining the manner of gathering the steel bars.

In FIG. 4, numeral 5 designates the cooling bed, numeral 18 a gathering conveyor, numeral 19 a gathering and transferring device, and numeral 20 a roller table located in front of the shear.

In such a constitution, the movement of a steel bar, for instance, the steel bar "a" will now be explained.

Firstly, when the steel bar "a" is transferred by movement of the cooling bed 5 and dropped off the cooling bed, it is then carried forward by the gathering conveyor 18. The gathering conveyor is caused to move by one groove before the next steel bar drops onto the gathering conveyor due to further movement of the cooling bed. Thus, when a required number of steel bars have been deposited on the gathering conveyor, the transferring device 19 moves the gathered steel bars "a" which are transferred on the roller table 20 in front of the specified shear. Accordingly, once a gathering pattern is established, if the timing of movement of the cooling bed and the timing of movement of the gathering conveyor are sequentially matched and the moving stroke of the gathering conveyor is so controlled that if for example some grooves should be left empty with respect to the gathering pattern, the moving stroke may be made for a plurality of grooves, not necessarily one stroke at all times, and the steel bars may thus be gathered on the gathering conveyor according to the desired gathering pattern.

Figure 5:
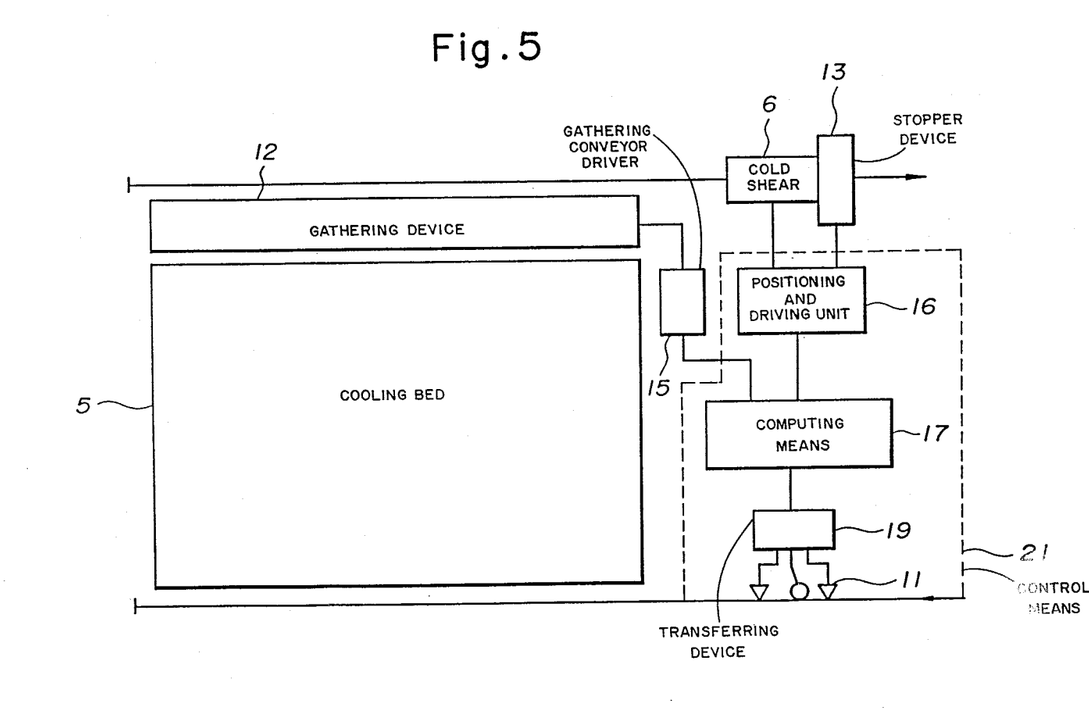
FIG. 5 is an enlarged view of the constitution in the vicinity of the control means.

FIG. 5 is an enlarged view showing the arrangement in the vicinity of the control means 21 which is adapted to automatically cut the materials gathered in the manner mentioned above. As shown in FIG. 5, the gathered materials are transferred to the shear 6 from the roller table 20 in front of said shear. The stopper device 13 for stopping the materials to be cut is fixed on the shear 6 at a predetermined position which allows the materials to be cut to the desired length and will be held at a lowered condition when the gathered materials are actually cut. The positioning and driving device 16 feeds the gathered materials while the stopper device 13 for stopping the materials to be cut is lowered. When the gathered materials are fed to the extent such that an appropriate length from the cutting blade face has been obtained, a command is provided to drive the shear and the gathered materials are positioned so that the materials may be cut. At this time, the gathering operation computing means 17 operates and determines the number of bars to be next gathered and the relative gathering groove pattern in accordance with the arrangement of the bar materials on the cooling bed, their length and the order requirement data provided in advance and in consideration of the rate of actual use of the respective grooves of the cutting blade face now to be employed.

Figure 6:
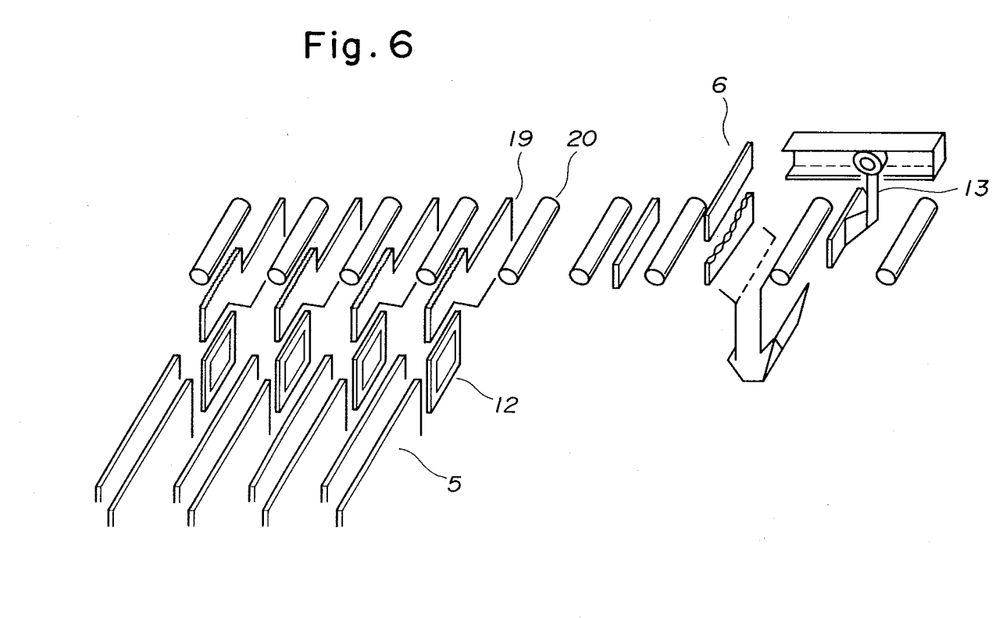
FIG. 6 is a perspective view illustrating the flow of the bars in the section shown in FIG. 5.

FIG. 6 illustrates for reference purposes a perspective view showing the construction from the side of the cooling bed 5 to the cold shear 6.

The constitution of the gathering operation computing means 17 will next be explained with reference to FIG. 7.

Figure 7:
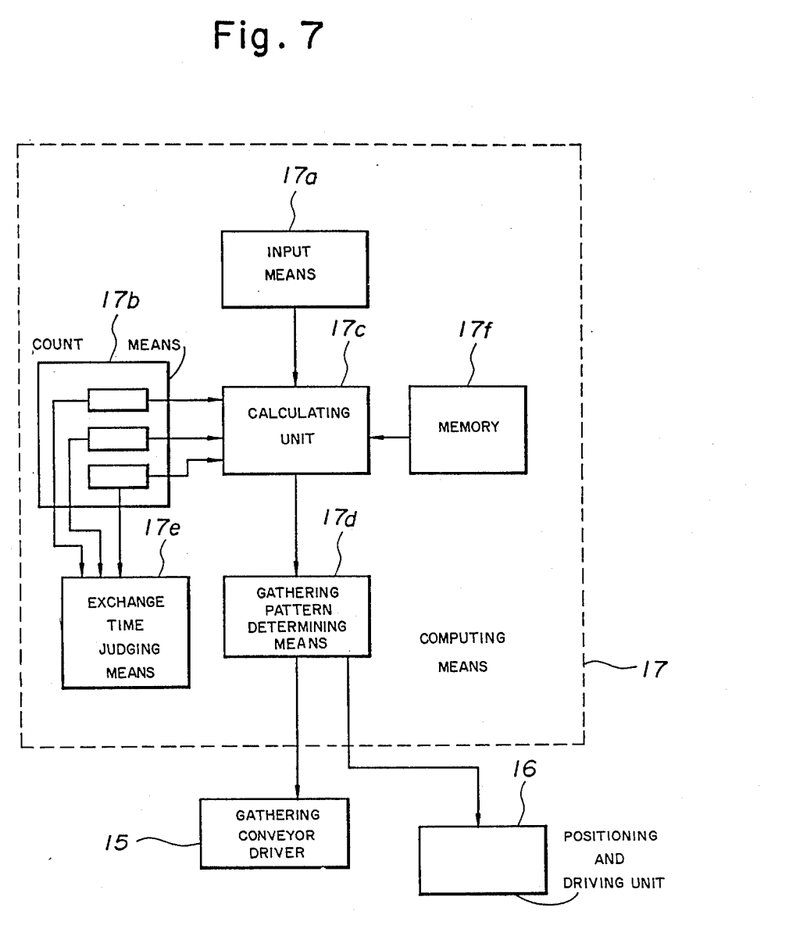
FIG. 7 is a block diagram of the gathering operation computing means.

In FIG. 7, numeral 17a designates an input means adapted to input information on any grooves which cannot be used, numeral 17b a count means adapted to count the respective numbers of bar materials which the respective grooves of the cutting blade have sheared, numeral 17c a calculating unit adapted to determine the groove patterns on which the steel bar materials to be cut are deposited in accordance with the input information from said input means 17a and the count information from said count means 17b, numeral 17d a means for determining the gathering pattern adapted to determine the gathering groove pattern in accordance with the operation conducted by said calculating unit 17c, numeral 17e a cutting blade exchange time judging means adapted to judge and indicate the time when it becomes necessary to change the cutting blade at the moment when the count means 17b has counted a specified number and numeral 17f a memory unit for storing the arrangement of the groove pattern for gathering the bar materials, said memory unit storing the bite table in respect of the respective sizes of the blades (called "bite") which determines which size bites should be used for a specific size of the steel bar materials to be cut and groove pattern tables for the number of grooves for each bite size from one to a maximum number, in the case of the present embodiment (FIG. 8), this being for three standard kinds of grooves.

Figure 8:
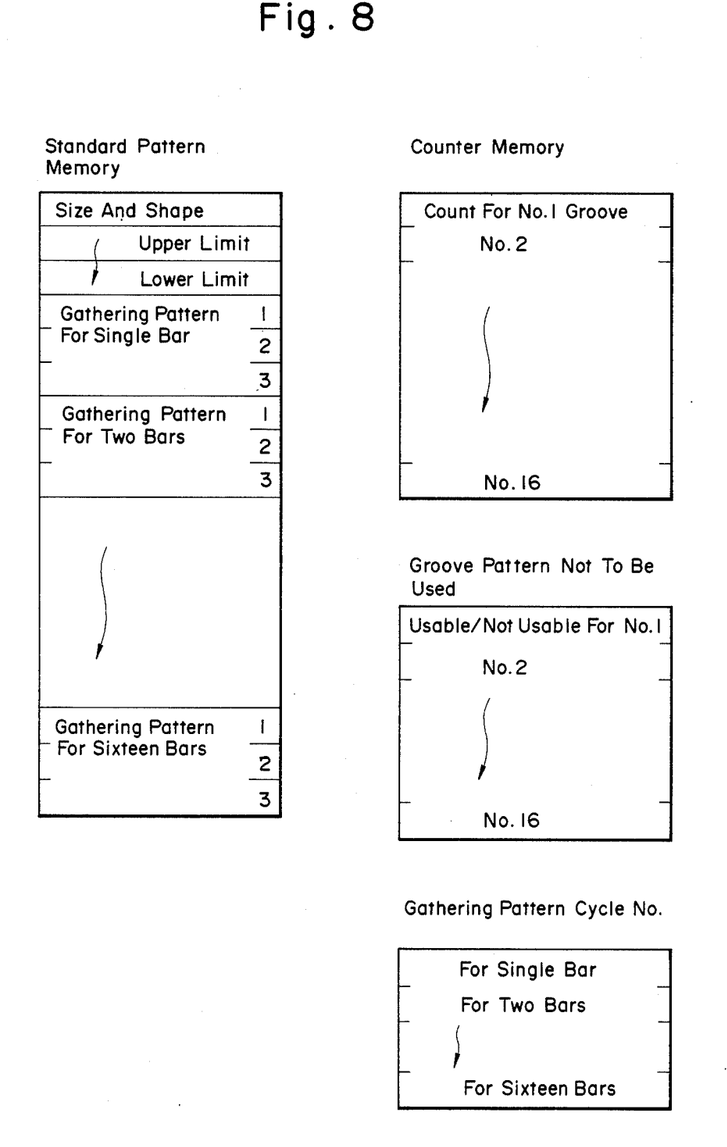
FIG. 8 illustrates a format of storage in a memory unit.

FIG. 8 is a format diagram showing the memory pattern stored by said memory unit 17f.

In the gathering operation computing means thus constituted, said input means 17a firstly has information input into it with respect to grooves which cannot be used when there are such grooves as may develop defects in the course of use or such grooves as are preferably not used due to defects in the mechanical system or scratches on the roller table or the like (FIG. 8).

As steel bar materials are fed onto the cooling bed and when the front end of a steel bar reaches the middle point on the cooling bed, the gathering operation is carried out. The procedure of said gathering operation will now be explained in accordance with the flow chart shown in FIG. 9.

Figure 9:
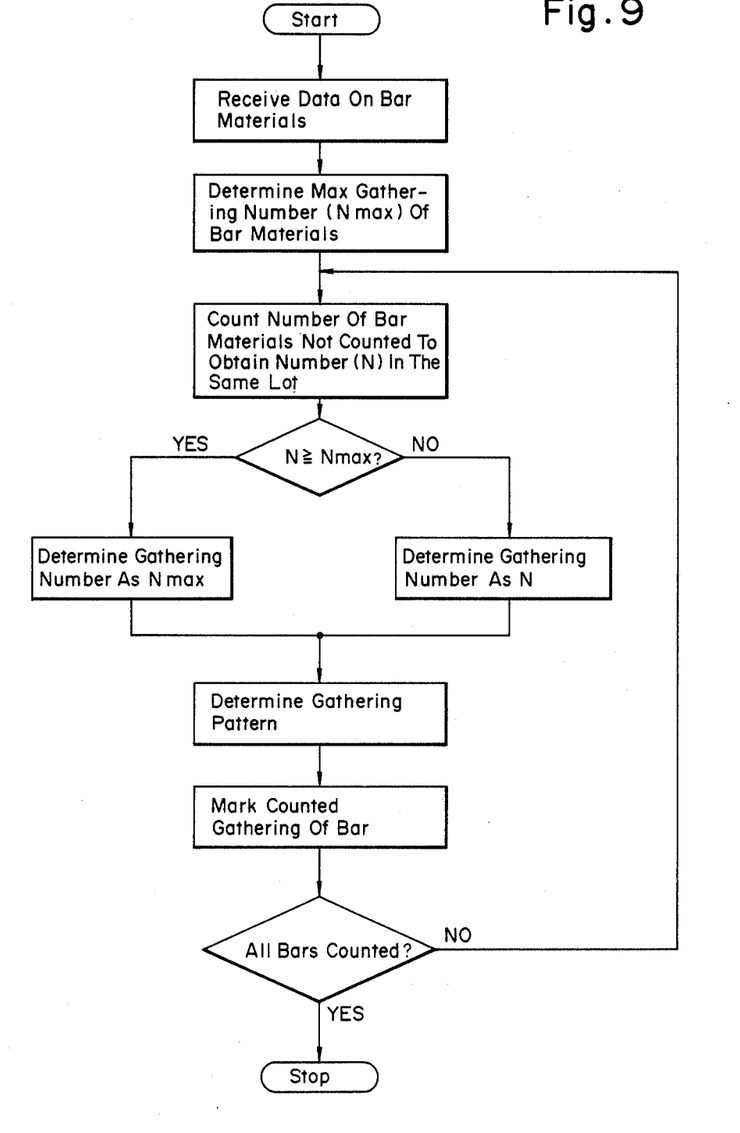
FIG. 9 is a flow chart showing a process of operation in accordance with the invention.

A gathering operation will be carried out firstly for the bar materials which are being transferred onto the cooling bed 5. Further, each lot of materials on the cooling bed 5 has to be classified with respect to the kind of composition or quality thereof and their length.

Then, the standard pattern memory in the memory unit 17f is checked in consideration of any grooves which cannot be used to see whether sixteen gathering patterns are available. If the gathering patterns for sixteen bars are not available, the number of gathering patterns is subtracted by one, and the maximum available gathering number Nmax is next determined.

Then, the number of bar materials contained in the single lot is counted from the first bar of the bars which are not counted yet, and the count is nominated as N. However, when the cutting length of the bar material deposited on the cooling bed is not the same for each, it is difficult to carry out processing for the remaining length. Counting is therefore conducted again and only those bar materials which are within 20 m in length in a single lot are counted, starting with the first one, the count being nominated again as N.

Subsequently, N and Nmax are compared. When N≧Nmax, the gathering number is determined as Nmax and if not, it is determined as N. With this number, the gathering pattern is checked and the pattern No. which is available in the gathering pattern cycle counter is determined as the gathering pattern, and the corresponding cycle counter is counted up. By doing this, even if the gathering number is identical, three kinds of gathering patterns may be cyclically selected in the present embodiment.

The bar materials thus counted are then marked and the same counting procedure proceeds with the bar materials not yet counted. Thus, the gathering pattern is determined by the gathering pattern determining means 17d for all the bar materials on the cooling bed.

Once the gathering pattern is determined the bar materials of each lot are conveyed on the cooling bed and transferred to the gathering conveyor 18 in accordance with the determined gathering pattern which allows the bar materials to be cut to the length predetermined for each lot of bar materials. Such cutting instruction information is given to the cold shear, and specified cutting may then be carried out.

Since the cutting length is specified, after portions of 200 mm of from the ends of bar materials are cut as a crop, the product bars are cut to the specified length following the crop. Since the stopper device 13 for stopping the materials to be cut is incorporated in the cold shear, the control means 21 serves to control the cutting operation in such a manner that when the materials to be cut are transferred to the position where they abut against the stopper device 13, said materials are cut to the specified length.

Furthermore, every time cutting is performed, the information on the rate of actual cutting is transmitted to the gathering operation computing means 17 where actual cutting for each groove is checked in accordance with the gathering pattern and the length of the bar materials. For the grooves which have been used for actual cutting, the count of actual cutting is counted up in the count means 17b.

When cutting for one gathered lot is completed, the number of cuttings for each groove is checked. If the difference between the maximum count and minimum count for the grooves excluding those which cannot be used is more than n, those grooves for which the rate of actual cutting exceeds (minimum count $+n$) are added to the grooves which cannot be used and are thereafter processed as being grooves which cannot be used. In this way, the gathering pattern is so controlled that the rate of actual use for each groove may be as near to uniform as possible.

Further, the maximum actual number of cutting is also checked at this time, and when such a number m is such that (1) $m > m_1$, an alarm will be provided to warn that the next bite has to be prepared, or where, (2) $m > m_2$, an alarm will be provided to warn that the bite has to be replaced.

The means 17e for judging the time of changing the bite indicates the appropriate time for the change. (Here, $m_1$ and $m_2$ are preselected.) From this indication, it is possible to determine the time for replacing a bite, thus improving the efficiency of the shear.

Although the above-mentioned embodiment describes an example where the shear has the maximum number of sixteen grooves, similar results may be obtained where the memory of the operation device corresponds to shears having a different number of grooves, such as twenty grooves, ten grooves or the like.

It is further to be noted that in the above-mentioned embodiment, the bar materials are controlled such that a pattern is provided on the gathering conveyor in accordance with the relevant gathering pattern before they are transferred to the roller table in front of the shear in the arrangement of such gathering pattern, but it is also possible to transfer the bar materials piece by piece from the exit end of the cooling bed by the use of a so-called magic hand or a manipulator.

It is further to be understood that the present invention is not limited to the application of cutting steel bars but may also be employed in cutting any other bar-like materials.

As explained above, the steel bar gathering control system according to the present invention is provided with a gathering operation computing means adapted to control the gathering of bar materials to be cut by automatically determining the groove pattern at the cutting face in accordance with the arrangement of the steel bars to be cut, their length and the relevant requirement data so that the rate of use of the cutting blades may be uniform over the entirety of one cutting face and is not localized. Thus every cutting groove on a shear may be used uniformly, no particular cutting grooves being used more frequently than others.

Further, according to another aspect of the present invention, since a count means adapted to count the rate of actual cutting for each cutting groove is provided, the time of replacing the bites may be indicated, thereby improving the efficiency of a shear.

What is claimed is:

1. A system for controlling a bar material cutting apparatus which includes a plurality of cutting bites for receiving the bar material in a gathering pattern and to simultaneously cut the bar material into a plurality of arranged bar pieces of a desired length, characterized by means for counting the number of the bar pieces for each of said cutting bites and a gathering operation computing means responsive to said counting means for controlling the gathering pattern of said bar pieces in such a manner that the rate of use of the cutting bites is uniform in accordance with the count of said counting means.

2. A system as recited in claim 1 wherein said gathering operation computing means includes as input means adapted to input information on cutting bites which cannot be used, said gathering operation computing means computing the gathering pattern while excluding the cutting bites indicated by said input means.

3. A system as recited in claim 1 wherein an alarm is provided when said counting means has counted a predetermined number.

* * * * *